UNITED STATES PATENT OFFICE.

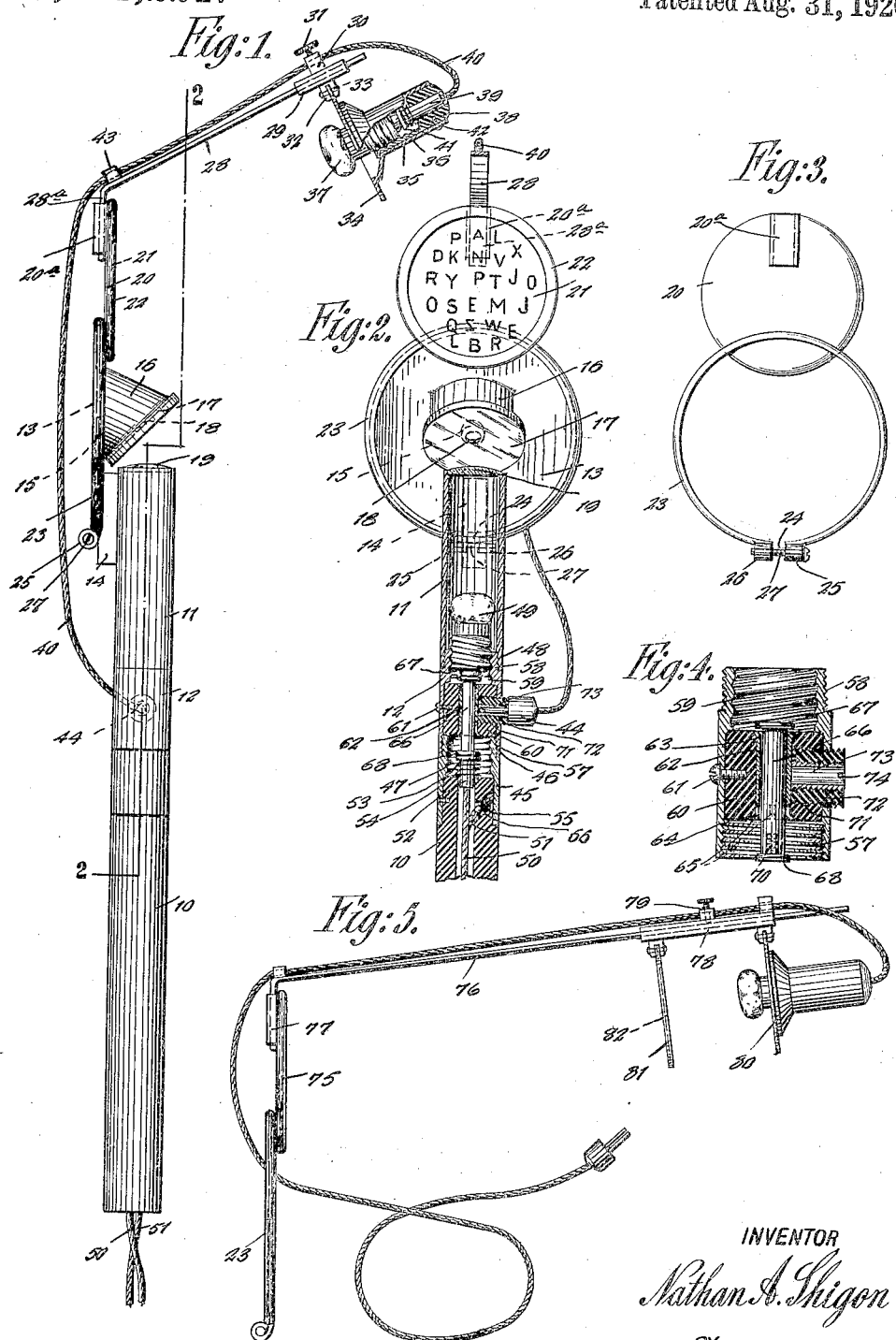

NATHAN A. SHIGON, OF NEW YORK, N. Y.

OPTICAL INSTRUMENT.

1,351,221.  Specification of Letters Patent.  Patented Aug. 31, 1920.

Application filed March 30, 1920. Serial No. 369,917.

*To all whom it may concern:*

Be it known that I, NATHAN A. SHIGON, a citizen of the United States, and a resident of the borough of the Bronx, county of Bronx, and city and State of New York, have invented certain new and useful Improvements in Optical Instruments, of which the following is a description.

The present invention relates to improvements in optical instruments, and more particularly in skiascope or other testing instruments, in which a chart, and an illuminating means for directing the light into the eye is employed.

It is an object of the present invention to provide in an instrument of this character, a source of illumination for the illuminating skiascopic mirror, and a source of illumination for the chart, comprising electric incandescent lamps receiving current from a common source, to the end that the device will be of relative simplicity, and may be conveniently operated.

Particularly I propose to provide a construction in which a single conductor, readily connected and disconnected, is provided for the source of illumination for the chart.

A further object is to provide improvements which may be conveniently used as an attachment for old forms of self-luminous skiascopes at present in use, and adapted to convert these skiascopes so that in addition to the skiascopic mirror, and illuminating means therefor, they include a chart and illuminating means for the chart.

With these and other objects in view, embodiments of my invention are shown in the accompanying drawings, and these embodiments will be hereinafter more fully described with reference thereto, and the invention will be finally pointed out and claimed.

In the drawings:

Figure 1 is a view in side elevation of the device, according to one embodiment of my invention;

Fig. 2 is a vertical sectional view taken along the line 2—2 of Fig. 1;

Fig. 3 is a detail view showing the chart means adapted to be secured to the skiascopic mirror;

Fig. 4 is an enlarged sectional view of a portion of the device, and hereinafter referred to as a coupling member, and Fig. 5 is a view in elevation of a modified form of chart means.

Similar reference characters indicate corresponding parts throughout the several figures of the drawing.

Referring to the drawings, and more particularly to Figs. 1 and 2 thereof, the skiascope, according to the present embodiment of my invention, comprises a sectional handle consisting of a lower cylindrical portion 10, an upper tubular member 11, and a coupling member 12, a disk or plate 13 being supported at the upper end of the member 11, being soldered or otherwise suitably secured upon a metal block 14 at the upper end of the said member 11, and having a central peep hole 15 surrounded by a tubular casing 16, supporting an oblique reflecting mirror 17, disposed above the end of the said member 11, the said mirror having a peep hole 18 therein in line with the peep hole 15 of the plate 13. A condensing lens 19 is provided in the end of the member 11, and within the said member an incandescent lamp, hereinafter more fully referred to, is disposed and adapted to illuminate the oblique mirror so that light may be reflected thereby into the eye of the patient.

A detachable chart plate 20, formed of metal, and having a lettered chart 21, secured thereon within its rim 22, is mounted upon the disk 13 above, below or to one side of the reflecting mirror by means of a metal channeled rim member 23, soldered or otherwise suitably secured to the back of the plate 20, being split at its lower portion, as at 24, and provided with lugs 25 and 26 at its extremities, having threaded holes therethrough, engaged by a tightening screw 27, adapted to clamp the rim about the periphery of the disk 13, the lugs 25 and 26, which are offset, contacting with the block 14 to effect a positive electrical conductive connection therebetween, the purpose of which will be presently more fully pointed out. The chart plate 20 may if desired be secured or otherwise directly connected to the metal plate 13. At the upper rear portion of the chart plate there is provided a strap $20^a$, in which there is adapted to be inserted the bent end $28^a$ of a forwardly extending upwardly inclined arm 28, upon which there is slidably and adjustably mounted, a sleeve bracket 29, having a post 30 at its upper side, on which is mounted a set screw 31 adapted to be tightened upon the arm to fix the position of the bracket, and provided at its lower side with a split lug 32, in which there is secured by a pin 33, the flange 34 of a lamp casing 35.

Within the forward end of the lamp casing, and in electrical conductive contact with the same, there is provided an interior screw-threaded sleeve 36, adapted to have screwed therein the electric incandescent lamp bulb 37, and in the rear of the casing there is set a plug 38 of rubber or other suitable insulating material, having a passage therethrough in which is slidably disposed the terminal 39 of a conductor wire 40, the said terminal having a contact head 41, between which and the plug there is disposed a spring 42 to insure positive contact of the terminal with the central contact point of the lamp. The conductor wire passes through a guide loop 43 formed on the arm 28, and is provided at its end with a plug 44, adapted to be plugged into the coupling member 12 to close the circuit of the lamp 37, as will hereinafter be more fully pointed out.

The lower portion 10 of the handle is preferably formed of hard rubber or other suitable insulating material, and is tubular in form. At its upper end there is mounted a metallic cap 45, reduced and exteriorly threaded at its upper end, as at 46, and in the absence of the coupling member 12, may be engaged by the interiorly threaded end 47 of the upper member 11. Interior screw threads 48 are provided in the cap, which may be engaged by the lamp bulb 49 in the absence of the coupling member.

These electric conductors 50 and 51 are disposed in the bore of the portion 10, and extend from the handle to a source of electric current. The conductor 50 is provided at its end with a metallic terminal 52, slidable in the end of the bore, and provided with a head 53, between which and the end of the member 10, there is provided a spring 54 to insure positive contact. The other conductor 51 is knotted at its end, as at 55, and this portion is disposed in a pocket 56 at the side of the bore, the bared end of the wire engaging the metal cap 45 interiorly to establish electrical contact relation therewith.

As a consequence of the construction of the members 10 and 11, enabling them to be connected together, the coupling member 12 is provided at its lower end with an interior threaded member 57, adapted to engage the threaded end 46 of the cap 45, and at its upper end is reduced and exteriorly threaded, as at 58, to engage the threads 48 of the upper member 11. Interior threads 59 at the upper end of the member 12, are adapted to be engaged by the lamp 49, and below this threaded portion there is inserted a tubular block 60 of rubber or other insulating material, fixed in place by set screws 61. Within the passage of the block 60 there is inserted a metal bushing or tube 62, flared at its ends, as at 63, and 64, to secure the same in place, one end having a plurality of splits 65 to facilitate the flaring of this end after the tube is inserted. Slidable within the tube 62 there is provided a plunger pin 66, having enlarged heads 67 and 68 at its ends, adapted to respectively engage the central contact of the lamp 49 and the terminal 52, thereby forming a closed electric circuit for this lamp through the said pin, and through the metallic case of the member 12, and which, it will be noted, is insulated from the pin 66 by the block 60. The head 68 is removable by means of a threaded shank connection 70 to facilitate assembly.

A threaded hole 71 is provided within the block 60, extending from the outer cylindrical surface to the bore, and into which is inserted a tubular insulating bushing 72, threaded exteriorly and interiorly, and projecting slightly beyond the outer end of the casing 12. Within this bushing there is screwed a metal sleeve 73 turned tightly against the sleeve 62 to establish electric contact therewith, being provided with notches 74 in its outer end to facilitate its turning by means of a screw driver. The plug 44 at the end of the conductor wire 40 is adapted to be inserted in the socket formed by the sleeve 73.

In assembling and forming the coupling member the hole 71 is first tapped into the side, and the bushing 72 screwed therein, and thereupon the passage through the block 60 is drilled, the bushing 72, which extends into the drilled portion, being cylindrically cut at its inner end. Thereupon the tube 62 is inserted, in the passage of the block 60, and by engagement with the end of the bushing 72, prevents it from being turned.

The conductor 51 is in electrical communication through the cap 45, the casing of the coupling member 12, the member 11, the rim 23, the chart plate 20, the arm 28, the bracket 29, the lug 32, the lamp flange 34 and lamp casing 35, and the threaded sleeve 36, with the metal screw threaded plug portion of the incandescent lamp 37, while the conductor 50 is electrically connected to the central contact point of the lamp 37 by the pin 66, the sleeve 62, the sleeve 73, the plug 44, the conductor wire 40 and the conductor terminal 39. In order to connect or disconnect the lamp 37, therefore, it is only necessary to insert or pull out the plug 44 from the socket formed by the sleeve 73.

In Fig. 5 I have illustrated a modified form of chart device, in which a mirror 75, having a metal backing, is supported upon the rim 23 in a similar manner to the chart plate 20, a forwardly extending detachable arm 76 being inserted in a strap portion 77 thereon, and having mounted thereon a slidable adjustable sleeve bracket 78, adapted to be fixed in position by a set screw 79, and supporting a lamp 80, and in front of the same a chart comprising a circular rim 81, and a disk 82 of translucent material, such, for instance, as celluloid, and having reversed characters thereon, which are reflected in the mirror. The mirror, it will be understood, may be plain, concave or convex.

In one form of my invention I may, if desired, provide a chart plate 20, having a chart 21 thereon, such as shown in Figs. 1 and 2, and also a chart mirror 75 at the side of the same, upon a single supporting rim 23, in which case either of the lamp supports, as shown respectively in Figs. 1 and 5, may be attached thereto, and the chart devices thereby formed, used selectively.

I have illustrated and described a preferred and satisfactory embodiment of my invention, but it is obvious that changes may be made therein within the spirit and scope thereof, as defined in the appended claims.

I claim:

1. In an optical instrument, a mirror, illuminating means arranged in proximity to the mirror and the latter being adapted to reflect light from the illuminating means, a chart arranged adjacent the mirror to be viewed by the patient, a second illuminating means arranged in position for illuminating the chart, a common support for said mirror, chart means, and both of said illuminating means, and electric conductors for both of said illuminating means and including said supporting means as a portion thereof.

2. In an optical instrument, the combination with supporting means, electric illuminating means carried thereby, electric conductors therefor, a skiascopic mirror also carried by said supporting means adapted to reflect light from the source of illumination, of chart means adapted to be viewed by the patient, a second illuminating means for the chart, a continuous electrically conductive structure extending from one of said conductors to said last-mentioned illuminating means, and including a support for said chart means and a support for the second illuminating means, and a single conductor extending from said second illuminating means to the other conductor of said first-mentioned illuminating means.

3. In an optical instrument, and in combination, electric illuminating means, electric conductors therefor, a skiascopic mirror arranged adjacent to said illuminating means to reflect light therefrom, chart means arranged adjacent to said mirror and adapted to be used by the patient, a second illuminating means for said chart means, and supporting means for all of said elements and constituting an electrical connection between both of said illuminating means.

4. In an optical instrument, the combination with an skiascope comprising a handle, a skiascopic mirror supported on said handle, an electric lamp in said handle, adapted to illuminate said mirror, a pair of conductors for said lamp, of chart means supported upon said skiascope, an electric lamp adapted to illuminate said chart means, removable means adapted to be inserted in said handle, having a socket adapted to receive said first-mentioned electric lamp, and provided with a plug socket electrically connected to one of the conductors of said lamp, a conductor wire connected to said last-mentioned lamp and adapted to be plugged into said plug socket, the structure of said handle, said skiascope and said chart means being electrically conductive, and adapted to conduct current from said other conductor of said first-mentioned electric lamp to said last-mentioned electric lamp.

5. In an optical instrument, the combination of a handle, an apertured plate carried on the upper end of the handle, a skiascopic mirror overlying the aperture of said plate, an electric lamp in said handle adapted to illuminate said mirror, a chart plate having a chart thereon, a clamping ring mounted on the chart plate and adjustably and removably engaging around the apertured plate, and means carried by the chart plate for illuminating the chart.

In testimony that I claim the foregoing as my invention, have signed my name hereunder.

NATHAN A. SHIGON.